United States Patent [19]

Schuster et al.

[11] Patent Number: 5,114,592
[45] Date of Patent: May 19, 1992

[54] PROCEDURE FOR SEPARATING ARSENIC FROM WASTE MATERIAL

[75] Inventors: Georg Schuster, Tegernheim; Hans Kaestle, Laub, both of Fed. Rep. of Germany

[73] Assignee: Walhalla-Kalk, Entwichlungs- und Vertriebsgesellschaft mbH, Fed. Rep. of Germany

[21] Appl. No.: 500,010

[22] Filed: Mar. 27, 1990

[30] Foreign Application Priority Data

Mar. 31, 1989 [EP] European Pat. Off. ............ 89105712

[51] Int. Cl.$^5$ ................................................. C02F 9/00
[52] U.S. Cl. ..................................... 210/667; 210/669; 210/670; 210/677; 210/686; 210/724; 210/726; 210/911; 423/602
[58] Field of Search ................................ 210/667–670, 210/677, 684, 686, 688, 723, 724, 726, 911, 912; 423/602

[56] References Cited

U.S. PATENT DOCUMENTS

| | | | |
|---|---|---|---|
| 3,414,512 | 12/1968 | Johnson | 210/51 |
| 4,341,636 | 6/1982 | Harder et al. | 210/662 |
| 4,366,128 | 12/1982 | Weir et al. | 423/602 |
| 4,566,975 | 1/1986 | Allgulin | 210/912 |

OTHER PUBLICATIONS

Chemical Abstract, vol. 97, No. 2, Jul. 12, 1982; "Dearsenization of Wastewater by Oxidation-Precipitation Method," H. Wang et al.

Primary Examiner—Ivars Cintins
Attorney, Agent, or Firm—Baker, Maxham, Jester & Meador

[57] ABSTRACT

The invention involves a process as well as apparatus for the separation of arsenic from waste material. The process includes precipitation of arsenic in the form of low solubility calcium magnesium arsenates by adding calcium and magnesium compounds to the waste, separation of calcium magnesium arsenates, putting the waste in contact with an ion exchanger, regenerating the ion exchanger after reaching the charge limit, adsorptively separating the arsenic by putting the waste in contact with active carbon, and separating the charged active carbon by itself or along with precipitation products. The process allows for a separation of arsenic from waste which is hard to be treated or contains heavy metals such as lead or contains sulfates to residual amounts as low as <0.3 mg As/l.

199 Claims, 4 Drawing Sheets

PROCEDURE FOR SEPARATING ARSENIC FROM WASTE MATERIAL

FIELD OF THE INVENTION

The invention involves a highly effective procedure as well as apparatus for separating arsenic from waste material, particularly industrial waste.

BACKGROUND OF THE INVENTION

A large number of industrial processes cause more or less arsenic containing effluents, which cannot effectively be processed with removal of arsenic during waste purification processes with present technology.

In the production of lead crystal and glass, arsenic trioxide ($As_2O_3$) is added, up to an amount of 2 mass-% of the molten glass, as a refining agent. Annually, 400 metric tons of arsenic are used for this purpose in the Federal Republic of Germany. Due to present technical limitations, the arsenic cannot simply be substituted with another, safer purifying agent. While part of the used arsenic escapes from the molten glass, an amount of approximately 0.2 mass-% remains in the combined state in the glass matrix.

However, during refining processes in which the surface is worked on, arsenic is again released. This happens in the so-called acidic polishing process, during which the glass is treated with sulfuric acid—hydrofluoric acid mixtures and is partially dissolved again, as well as during the process of cutting glass. Acidic polishing baths contain approximately 40-100 mg As/l while waste from cutting procedures contains typically approximately 1 mg As/l or when recirculated up to approximately 10 mg As/l.

Furthermore, arsenic containing lyes occur when producing nonferrous metals. As an example water soluble arsenic is found in soda slag of pyrometallurgical processes with a concentration up to 4000 mg As/l. Solutions with relatively high concentrations, around several mg/l of arsenic, also occur during wet waste gas purification, such as the desulfurization of flue gas, and in eluates of combustion residues. Waste material containing arsenic also results from the production of micro chips when etching the gallium arsenide used therefor.

Due to the high toxicity of arsenic there is a great need to diminish the content of arsenic in waste material as much as possible.

Experiments regarding the removal of arsenic from effluents produced by the glass industry when cutting glass are described in the Research Report 10207001/06, dated Aug. 1986, produced by the Fraunhofer-Institute for Silicate Research in Wurzburg, Federal Republic of Germany. This research was conducted within the Plan for Environmental Research by the Federal Minister for Domestic Affairs of the Federal Republic of Germany. Industrial effluents such as these contain up to approximately 3 mg As/l and up to approximately 10 mg Pb/l as well as cooling agents, lubricating agents and tensides. The pH-value of such effluents is between 7 and 8.

Within the scope of these experiments several different procedure possibilities for separating arsenic from waste have been tested systematically. Aside from experiments of reducing arsenic on the surface of metals, such as iron and zinc, other experiments were also conducted to precipitate arsenic as arsenic sulfide, as calcium arsenate, as ferro arsenate, as magnesium arsenate, as aluminum arsenate, and as lead arsenate. In all of those cases only a separation degree of less than 50% could be obtained.

Further experiments examined separation by means of adsorption to silica gel containing titanium oxide, alumina and active carbon. The above Research Report at page 14 states that no relevant decrease of the arsenic content in waste was noticeable when using silica gel and active carbon. Only the use of aluminum oxide resulted in a minimal decrease of the arsenic content. However, this reduction is too small for a practical application.

The only somewhat promising separation method of arsenic among all the systematically conducted experiments turned out to be the precipitation with ferric salts with or without previous oxidation of As(III) to As(V). This procedure resulted in a decrease of arsenic from 4 mg/l to less than 0.1 mg/l in suitable effluents. In waste material produced by acidic polishing in the glass industry, which can contain arsenic up to 100 mg/l in strongly acidic solutions, the content of arsenic could only be reduced by one half through precipitation of sulfide of arsenic, through dissolution of iron sulfide in acidic waste (see page 50 of the Research Report).

In other words, samples with an initial content of arsenic of approximately 15 mg/l subsequently still contained 6 to 7 mg/l of arsenic. Due to the extensive amount of experiments regarding the separation of arsenic (see page 50 of the Research Report) it is thus established that according to current technology even an elaboration of a proposal of a possible technical procedure for separating arsenic requires further laboratory experiments. The Research Report, on page 51, points out that there is no existing proposal for a procedure that will separate arsenic from effluents produced by acidic polishing.

In the publication "Ecologically Harmless Technologies For The Production Of Lead Crystal And Crystal—Removal Of Arsenic From Effluents Produced When Cutting Glass" of the Fraunhofer Institute for Silicate Research, Wurzburg, Federal Republic of Germany, the separation of arsenic from waste is described as a formation of ferric arsenate under coprecipitation in a ferric hydroxide precipitation which occurs according to the following gross reaction equation:

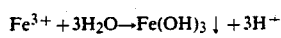

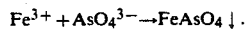

To avoid a decrease of the pH-value due to the added iron sulfate, solution a calcium hydroxide suspension is used for neutralization, whereby the sulfate ions are precipitated as gypsum. This procedure allows, however, only for glass making waste with small amounts of arsenic, for a reduction of the arsenic content up to an amount below 0.1 mg/l, but this is not applicable, for example to effluents from acidic polishing procedures. In these cases only 50% of the arsenic content can be separated.

The pamphlet ATV-VKS M352 (dated Apr. 1987) on the "Treatment and Removal of Scorodite Mud" suggests to transform water soluble arsenic from pyrometallurgic procedures (scorodite=ferric arsenate FeAsO$_4$) in a concentration of 1000 to 4000 mg/l in a sulfuric acid solution into arsenic(V) with the aid of chlorine, and to precipitate it at temperatures of 60° to 70° C. and pH-values of less than 1 by means of adding ferric salts and subsequent careful raising of the pH-value to 2 to 2.5 with calcium hydroxide. The article does not give any remarks on the efficiency of the precipitation or the remaining concentration of dissolved arsenic. In some processes, 0.3 to 2 mg As/l, 50 to 300 mg Cu/l, 100 to 300 mg Zn/l, 1 to 3 mg Pb/l. 0.1 to 1 mg Fe/l as well as 500 mg Cl/l have been found in the eluates. The amounts of sulfate and calcium correspond approximately to the solubility of plaster. This publication also points out that no alkaline reactions and no reduction procedures should be carried out in order to not increase the solubility of arsenic.

The separation of arsenic from waste according to the above described procedure, the precipitation as ferric arsenate, is further also the subject of German patent application publications 3,632,138 and 3,633,066, with or without previous oxidation of the trivalent arsenic.

The separation of arsenic from waste by means of precipitation of ferric arsenate is thus only applicable to certain, suitable effluents and is not a generally suitable separation procedure for arsenic.

German patent application publication 3,637,643 further describes a procedure for the arsenic decontamination of aqueous solutions, which is based on the oxidation of arsenic(III) to arsenic(V) and the pressure filtration of waste after adding a water soluble polymeric anion exchanger through a membrane. In this process, the arsenic is enriched above the membrane.

According to this method the anion exchangers are polymers with molar masses of 30,000 to 100,000 in connection with membranes of a preclusion limit of $10^4$, for example, polyethylenimines. The arsenic concentration of the solution to be decontaminated must not be higher than 2 mg/l if this procedure is applied in one step. Due to the method of membrane filtration used here, this procedure is basically not suitable for an application on a industrial scale.

SUMMARY OF THE INVENTION

It is an object of the invention to provide a procedure as well as an apparatus for a highly efficient separation of arsenic from waste material, which are applicable to industrial effluents and which make it possible to reduce the arsenic to corresponding final concentration values conforming with waste regulations regardless of the origin of respective effluents. The procedure ideally starts out with cheap, readily available materials that do not result in further environmental problems, and the same should apply for the final products. The procedure should also operate highly economically with respect to the consumption of energy and material and be as well applicable to waste which is difficult to treat.

The method for separating arsenic from waste according to the invention is characterized by following steps:

(A1) Precipitation of arsenic in the form of low solubility calcium magnesium arsenate by adding at least one calcium compound and at least one magnesium compound to the waste at a pH value of 2 to 12 and preferably 9 to 11 during a precipitation span of approximately 10 to 60 min., preferably 30 min., and (A2) separation of the calcium magnesium arsenates, and/or (B1) putting the waste in contact with an ion exchanger, preferably a strongly basic anion exchanger, at a pH value of 2 to 12 and preferably 7 to 11.5, and, if desired (B2) regenerating the ion exchanger after reaching the charge limit, and/or (C1) adsorptively separating arsenic through putting it in contact with active carbon at a pH-value of 2 to 11 and preferably 2 to 4, and (C2) separating the charged active carbon by itself or with precipitation products.

At a suitable pH value in the alkaline range as well as corresponding excess of magnesium compound, magnesium hydroxide is precipitated simultaneously during step A1 which influences the separation result favorably. A particularly favorable condition for the adsorptive separation of arsenic in step C1 is a pH-value of 3 or 11.

A particularly suitable apparatus according to the invention for conducting the procedure mentioned above is characterized by the following fundamental components, the sequence of which corresponds to the reaction course:

an oxidation and precipitation reactor for the precipitation of calcium magnesium arsenates, which is connectable through connecting tubes to a reservoir containing an oxidation agent, another reservoir for a magnesium compound and yet another reservoir for a calcium compound, and features a pH-regulation device, and a separation reactor for separating the calcium magnesium arsenates from the residual effluents, and/or an adsorption reactor to put the sewage in contact with active carbon, eventually with a regenerating apparatus, and/or an ion exchanger, possibly with a regeneration apparatus.

According to current technology the adsorption agents for the adsorptive separation of arsenic are active carbon, aluminum and aluminum oxide as well as silica gel. These agents, however, are said to be not very efficient. Another possibility is the adsorptive binding of arsenic to freshly precipitated magnesium hydroxide. One gram of freshly precipitated magnesium hydroxide is supposed to be able to adsorptively bind 125 mg of arsenic according to bibliographic references. This adsorption capacity has been used when administering magnesium hydroxide as an antidote for poisoning through arsenic.

As explained above, prior art further suggests that arsenic can be precipitated from aqueous solutions as arsenic sulfide, calcium arsenate, ferric arsenate, manganese arsenate, lead arsenate and magnesium ammonium arsenate. Nevertheless, for the same reasons explained above, these precipitation reactions are also not suitable for technical processing of waste material containing arsenic. An additional factor is that the ferric arsenates, scorodite, simplisit and ferrisimplisit, are decomposed by bases and are all completely soluble in acids.

As apparent from the following Table 1, there are partially very diverse data found in bibliographical references { such as Gmelin, Handbuch der anorganischen Chemie, Teil B, 8th Edition, Verlag Chemie Weihneim (1956)} regarding the solubility of calcium arsenates.

TABLE 1

| Solubility of calcium arsenates in water | |
|---|---|
| Compound | Solubility (mg/l) |
| $Ca_3(AsO_4)_2.10H_2O$ | 170 (20° C.) |
| $Ca_3(AsO_4)_2.2H_2O$ | 133 (20° C.) |
| $4CaO.As_2O_5.5H_2O$ | 150 (17° C.) |

TABLE 1-continued

| Solubility of calcium arsenates in water | |
|---|---|
| Compound | Solubility (mg/l) |
| 4CaO.As$_2$O$_5$ | 120 (17° C.) |
| 4CaO.As$_2$O$_5$.H$_2$O | 120 |
| Precipitation from hot solutions | |
| As$_2$O$_5$ | 32 |
| Ca$_3$(AsO$_4$)$_2$ | 55 |

As may also be seen from the prior art as explained above, Ca$_3$(AsO$_4$)$_2$·8H$_2$O yields up to 3% water soluble arsenic oxide. Basic tricalcium arsenate Ca$_3$(AsO$_4$)$_2$·Ca(OH)$_2$ has furthermore a very low water solubility.

It is therefore safe to assume that calcium arsenates have a solubility in the range of 60 to 200 mg/l, which corresponds to approximately 20 to 70 mg As/l. Calcium salts are hence not suitable for the precipitation of arsenic from waste. Even though their solubility can be lowered by zinc ions, heavy metal ions as well as fluorides or complex fluorides, no significant decrease in solubility of calcium arsenate can be obtained, regardless of the new problems such additives would cause.

Bibliographical references further suggest, however, not in respect with the processing of waste, that calcium ammonium arsenate and magnesium ammonium arsenate have low solubility. For the above reasons, calcium magnesium arsenates have not been considered for the separation of arsenic from waste material.

It is advantageous when carrying out the procedure according to the invention to oxidize arsenic, As(III) (contained in the waste) to As(V) (AsO$_4^{3-}$) with suitable oxidation agents, such as CaO$_2$, MgO$_2$, or H$_2$O$_2$, at a pH value in the acid or alkaline range. The use of H$_2$O$_2$ is particularly preferred because it is converted by the oxidation into water. Further, the oxidation with H$_2$O$_2$ is preferably carried out at a pH value in the acid range is preferred as well as the use of H$_2$O$_2$ because it is converted to water during oxidation. This oxidation can also be carried out simultaneously with the precipitation of the calcium magnesium arsenates or before.

If the effluents to be treated contain sulfate ions which have to be separated, this can be accomplished by means of precipitation of calcium sulfate by adding Ca(OH)$_2$ to the waste material as process step I and separating the precipitated CaSO$_4$ in process step II. This reaction should preferably be performed at a pH-value of 3±1 if the precipitation of CaSO$_4$ is done before step A1, and at a pH-value of 3±1 or 8.0 to 11.0, if the CaSO$_4$ precipitation is performed before step B1 or C1 respectively, hence particularly after step A2.

Alternatively or after a preceding sulfate separation by means of precipitation of CaSO$_4$ as described above, sulfates can also be separated in process step IV from the waste through precipitation of calcium aluminate sulfates (process step III) of low solubility by adding reactive aluminum oxide and/or calcium aluminates, preferably aluminous cement. The pH-value during this process is maintained at a constant level of 11.2 to 11.8 by adding Ca(OH)$_2$.

If the preliminary precipitation has been performed with lime milk at a pH-value of 3±1, the arsenic contained in the waste remains in solution. This is particularly important since with waste containing large amounts of sulfate as well as concentrated waste, a separation of about 75 to 80% of the entire mud as CaSO$_4$ is possible at this level. This mud contains only extraordinarily low amounts of heavy metals and arsenic in particular, so that such mud can be disposed of at customary disposal sites such as rubble disposal sites. If necessary the arsenic contained in the water of the press cake can be removed by washing at this level. This also applies to the precipitation product of the calcium aluminate sulfate precipitation. This procedure is known from European patent application publication 25 06 26.

In a particularly advantageous embodiment of the method of the invention, which yields an up to now unachieved decrease of the residual concentration of arsenic in the run off water to a value in the range of ≦0.5 mg As/l, the preliminary treated effluents (preferably from steps A2, C2, II or IV, respectively) are put into contact with an ion exchanger, preferably a strongly basic anion exchanger, and preferably at a pH value in the alkaline to neutral range.

Strongly basic anion exchangers are generally cross-linked polystyrene resins with a macroporous structure, which comprise quaternary ammonium groups as functional groups. With respect to this one has to distinguish between two types:

Type I resins with the active group

—N(CH$_3$)$_3$OH and
Type II resins with the active group

—N{(CH$_3$)$_2$(C$_2$H$_4$OH)}OH.

Type I anion exchange resins have a higher basicity with respect to type II anion exchange resins. However, they have a lower capacity and a less distinct regeneration ability, whereas on the other hand, their oxidation susceptibility is lower. Furthermore, type II anion exchangers cause a greater slip.

The most important characteristics of these anion exchangers are:

| Total capacity: | approximately 1.2 val/l moist resin (both types); |
|---|---|
| Utilizable capacity: | 0.4 to 0.6 val/l moist resin for type I and approximately 0.7 val/l moist resin for type II. |

The affinity of these anion exchangers to various anions accounts for the OH-form of the following sequence:

I$^-$ > SO$_4^{2-}$ > NO$_3^-$ > CrO$_4^{2-}$ >

PO$_4^{3-}$ > AsO$_4$ > Oxalate > NO$_2$, Cl$^-$

> formate > citrate > tartrate > phenolate > F$^-$ > acetate >

HCO$_3^-$ > HSiO$_3^-$ > CN$^-$ > H$_2$BO$_3^-$ > OH$^-$.

Macro-porous anion exchanger resins are also suitable for the procedure according to the invention. They even offer additional advantages, insofar that macroporous anion exchangers have a greater mechanical durability and yield better treating results and have a greater resistency against poisoning due to water charged for colloids. The charging capacity with organic material is higher for macroporous exchangers than for conventional resins. Also higher is the elution degree for regeneration.

Furthermore, according to the invention, favorable "mixed bed" ion exchangers can be used, in which cation exchanger and anion exchanger particles are present in one and the same device. For regeneration, the two resins are separated by hydraulic swirling measures because the two resins have different densities. After separation the resins are regenerated separately and following regeneration they are again transferred into a mixed bed, for example by means of compressed air. The use of exchanger cartridges is also advantageous. The regeneration of the ion exchanger resins is carried out in a conventional manner, after reaching the charge limit.

Compared with the desalination with separate exchanger beds, the desalination in a mixed bed has the advantage of a very constant quality of water, the use of a pH value close to the neutral point, as well as a smaller consumption of wash water.

Highly basic anion exchangers require a great excess of NaOH to transfer into the OH-form. This excess usually amounts to 200 to 400% of the theoretical value in the form of a 4-5% solution.

According to the invention it is particularly advantageous, when using a mixed bed ion exchanger, to use the anion exchanger in the chloride form and the cation exchanger in the H-form, since regeneration can then be effected with hydrochloric acid being the only regenerating agent.

The adsorptive separation of arsenic in the procedure according to the invention occurs by means of putting the waste in contact with active carbon. Different types of active carbon with certain differences in the properties due to the production process are customary.

The adsorption of arsenic from waste material can be carried out by adding powdery active carbon into the waste in step C1 as well as by bringing the effluents in contact with an active-carbon fixed bed, which, in effect, is a simultaneous carrying out of steps C1 and C2.

Because of chemical engineering reasons as well as reasons of better regeneration ability, the use of an active-carbon fixed bed is preferred in this invention. The regeneration of active carbon takes place in the conventional manner. The thermal regeneration of the charged active carbon conveniently yields the adsorbed arsenic.

The precipitation products or solids from steps A2, C2, II or IV, are washed if necessary, after adjusting the pH value, with water. In this case the water used for washing is led back into the used crude waste water. Precipitation products and solids from step A2 in particular can be compressed and disposed of. The same applies to steps II and IV. It is also advantageous to return the regeneration solutions from step B2 to step A1, the precipitation of arsenic, or to step C1, the adsorptive separation of arsenic.

Another advantage is to separate the arsenic contained in the regeneration solutions from step B2 in the form of low solubility arsenic compounds, for example, in the form of arsenic sulfide. In this case the obtained solutions are returned to step A1, the precipitation of arsenic, or step C1, the adsorptive separation of arsenic. Conveniently they can also be reused as regeneration solutions.

According to the invention at least one calcium compound and at least one magnesium compound and specifically corresponding salts are used. A suitable calcium compound is hydrated calcium oxide and a suitable magnesium compound is magnesium hydroxide. Alternatively magnesium salts, preferably magnesium chloride, can be used as a magnesium compound in step A1.

In the apparatus according to the invention the reservoir for the magnesium compound, may be a single reservoir, and the one for the calcium compound, out of which the calcium and the magnesium compounds can be dispensed into the precipitation reactor in a constant, predetermined molar ratio. It can also be an advantage to combine the oxidation and precipitation reactor with the following separation reactor. The eventually provided active-carbon fixed bed reactor conveniently contains a regeneration apparatus, which not only regenerates the active carbon but also yields the arsenic desorbed therefrom.

In case the apparatus is used for treating sulfate containing waste, the apparatus of the invention provides a second precipitation reactor which is connectable with the reservoir for lime milk or calcium aluminate and contains a pH control means. This second precipitation reactor, which is followed by another separation reactor, serves for the precipitation of calcium sulfate or calcium aluminate sulfates respectively, as described above. This unit, the precipitation reactor followed by the separation reactor, can be placed before the oxidation and precipitation reactor, between the latter and the adsorption reactor or the following ion exchanger.

The separation reactors according to the invention are either sedimentation reactors or centrifuges.

BRIEF DESCRIPTION OF THE DRAWING

The objects, advantages and features of the invention will be more readily perceived from the following detailed description, when read in conjunction with the accompanying drawing, in which.

DESCRIPTION OF THE PREFERRED EMBODIMENTS

Figure 2:
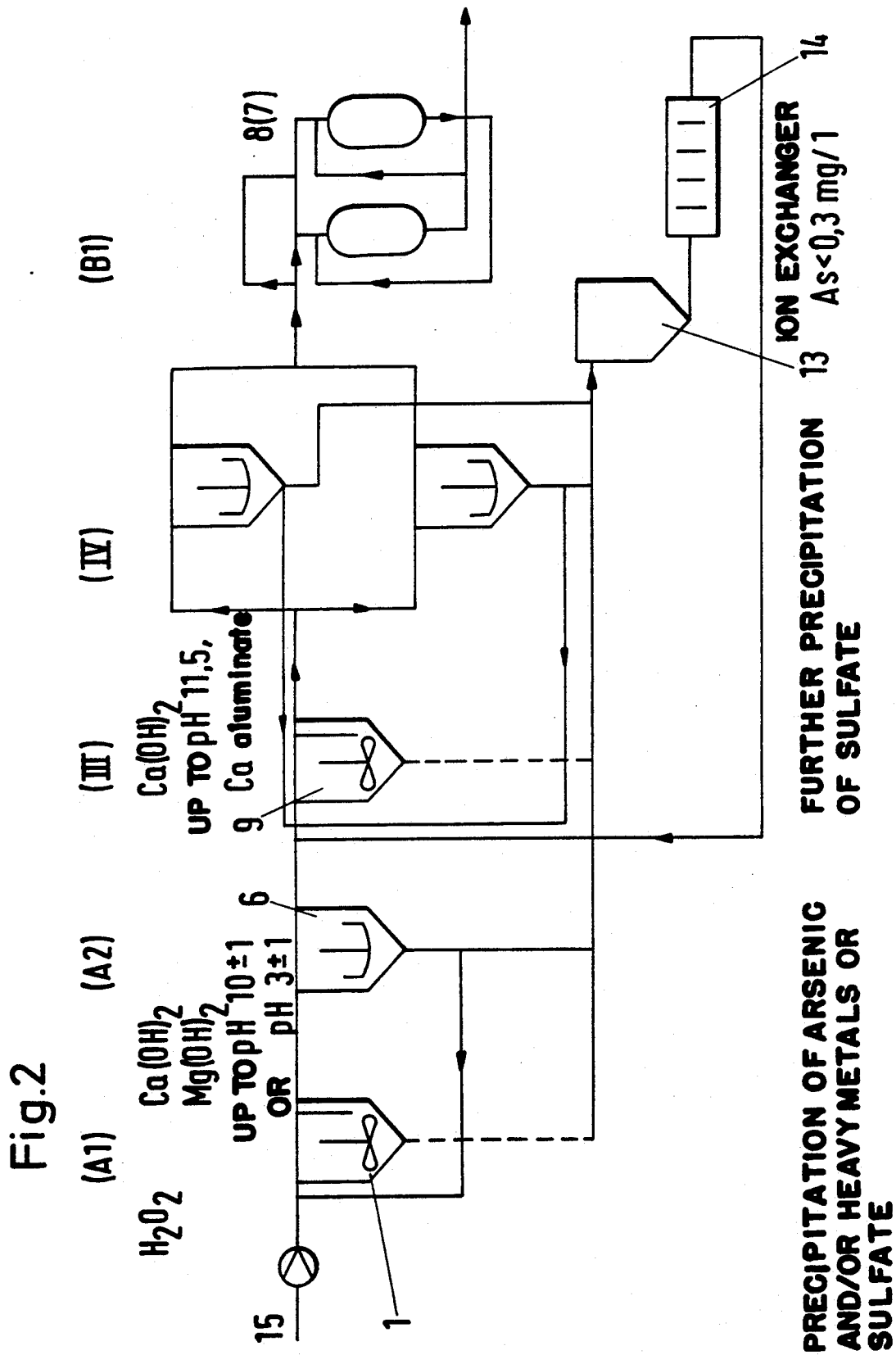
FIG. 2 is a schematic representation of an alternative embodiment of batch-wise operated apparatus of the invention to first precipitate and separate calcium magnesium arsenates after preliminary oxidation of arsenic.
Figure 3:
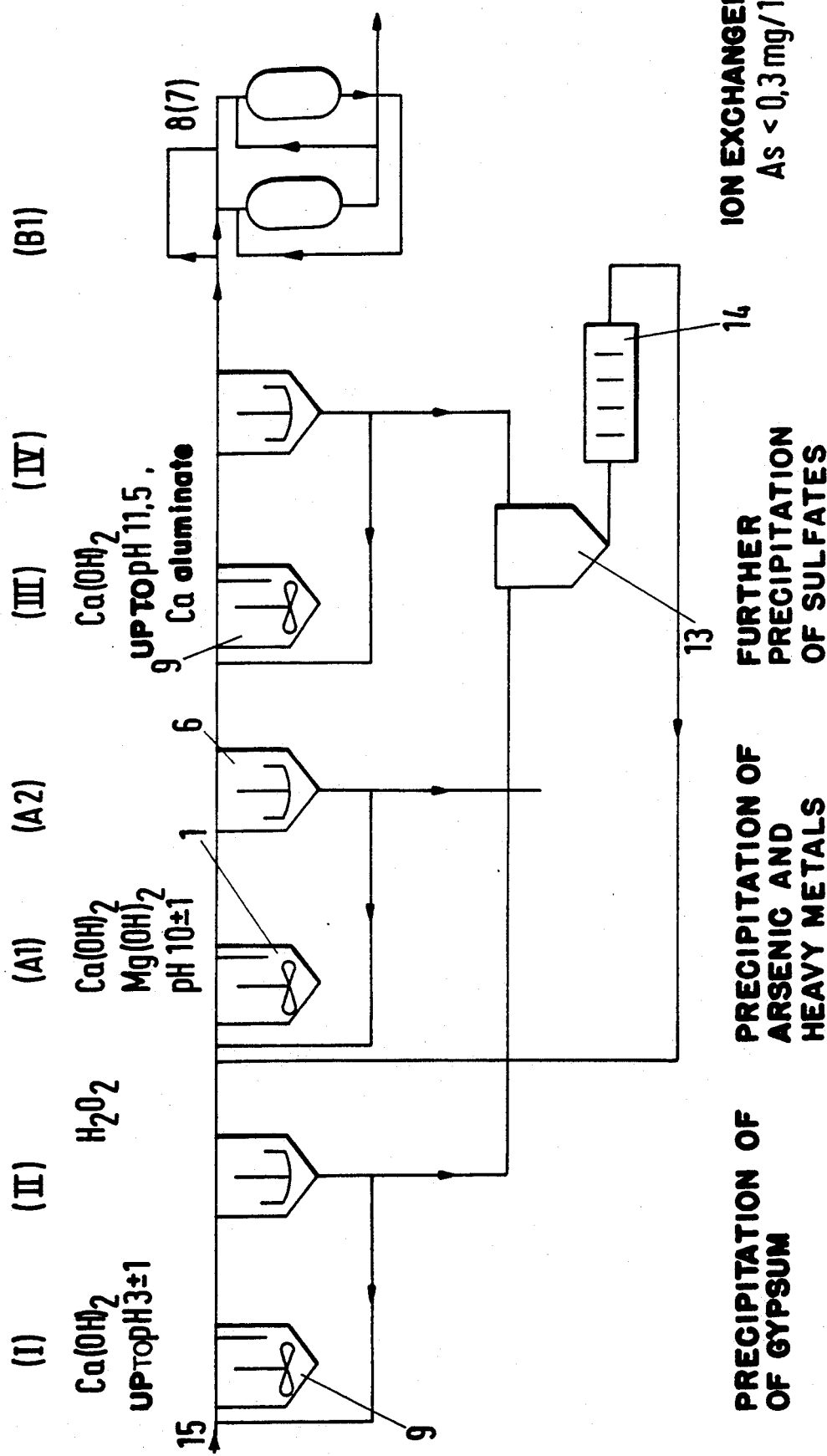
FIG. 3 is a schematic representation of an apparatus according to the invention for continuous separation of arsenic and processing/treatment of water.
Figure 4:
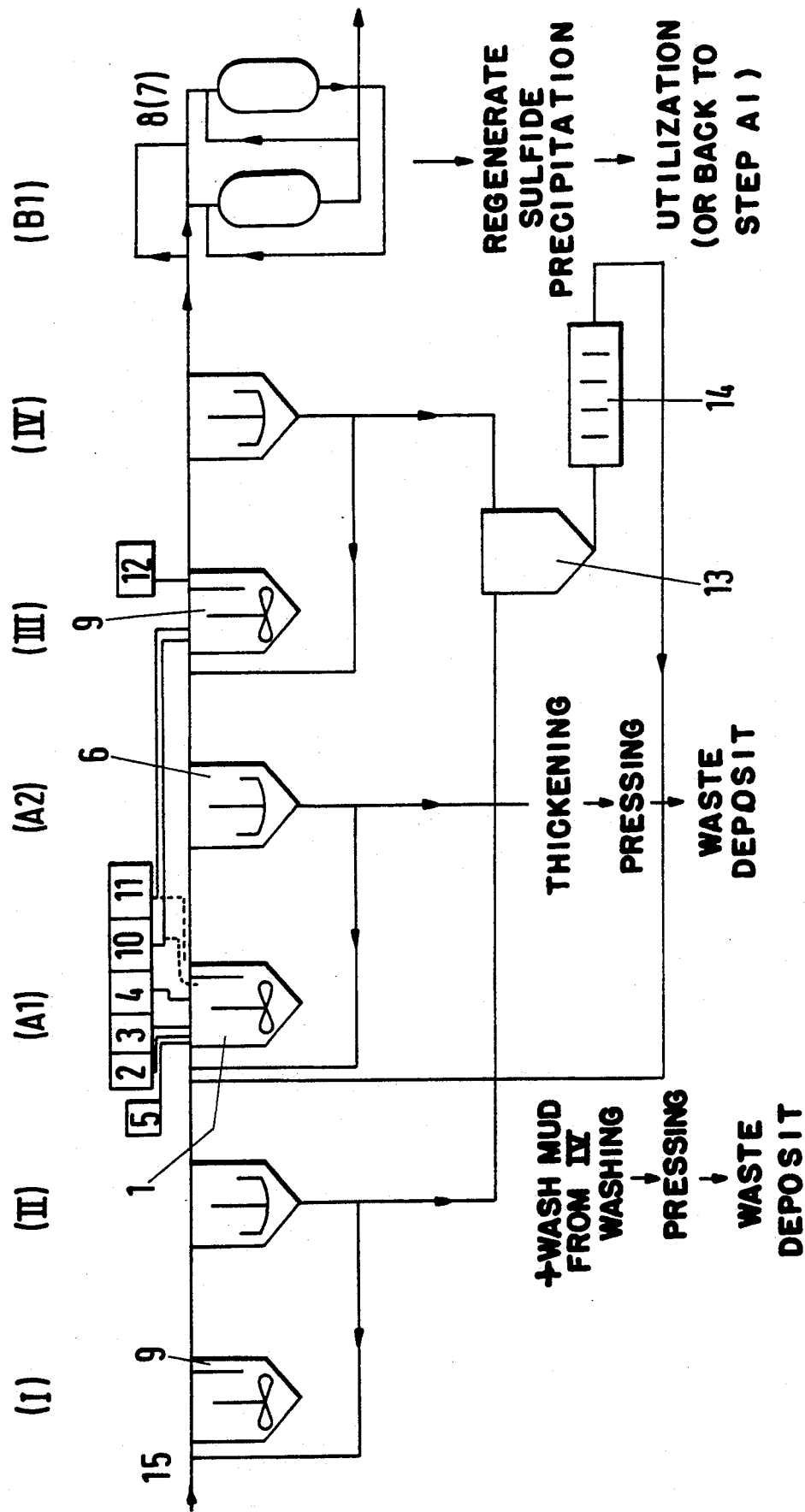
FIG. 4 is a schematic representation of a more comprehensive continuous treatment apparatus functioning according to the invention.

The individual procedure steps in FIGS. 1 to 4; particularly FIG. 4, employ the following identified reference numerals:

1—Oxidation and precipitation reactor
2—Reservoir for oxidation agent
3—Reservoir for calcium compound
4—Reservoir for magnesium compound
5—pH control means (device)
6—Separation reactor for separating precipitated calcium magnesium arsenates
7—Adsorption reactor
8—Ion exchanger
9—Precipitation reactor for the precipitation of sulfate as calcium sulfate or calcium aluminate sulfate respectively
10—Reservoir for milk of lime
11—Reservoir for calcium aluminate 12—pH control means (device)
13—Thickener
14—Press
15—Waste inlet.

Figure 1:
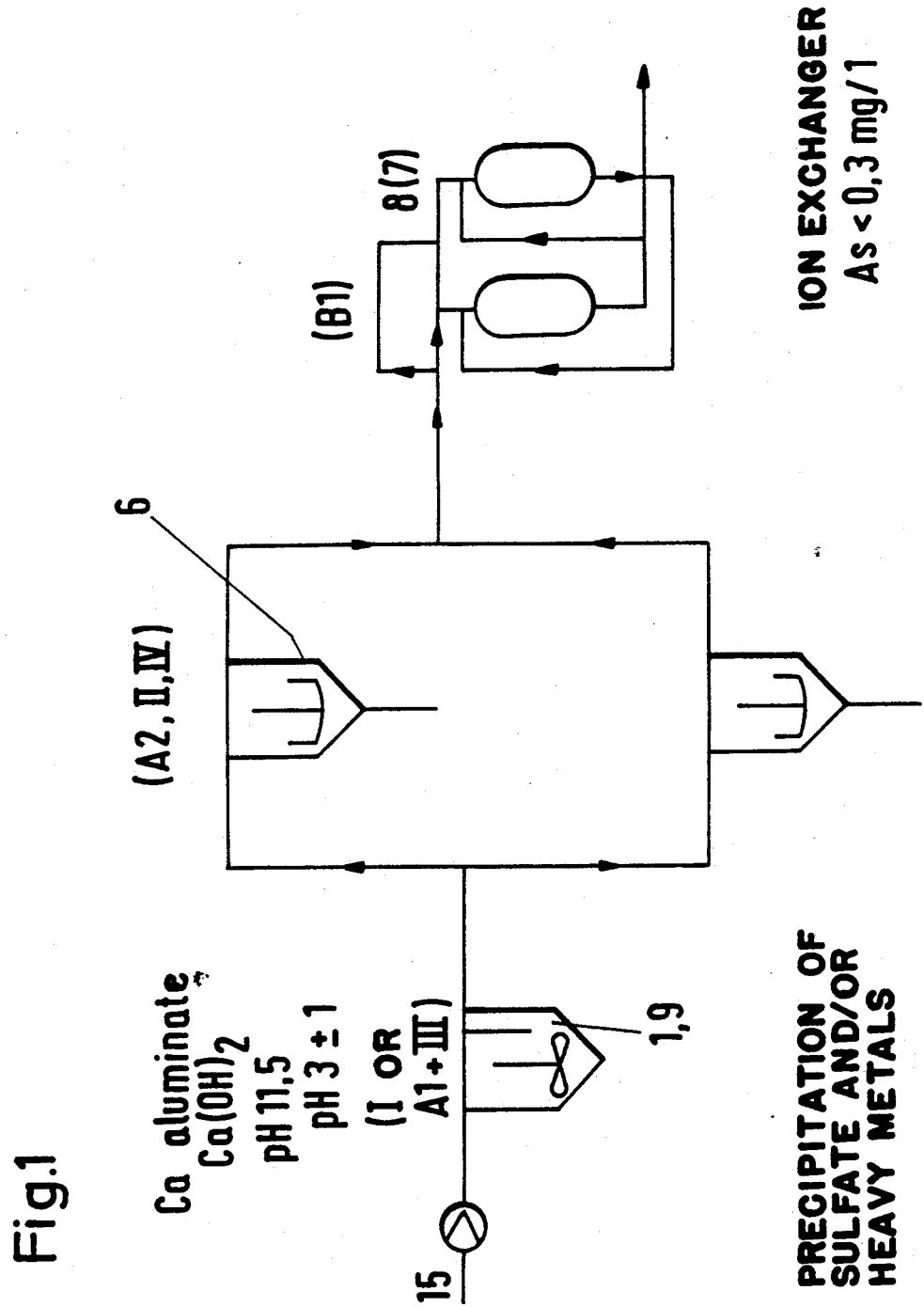
FIG. 1 is a schematic representation of batch-wise operated apparatus according to the invention for separating arsenic through the exchange of ions with a preliminary separation of sulfate by means of precipitation.

The apparatus of FIG. 1, in addition to providing a preliminary separation of sulfate, also preliminarily separates heavy metals if necessary, by means of precipitation. This apparatus functions batch wise in a discontinuous manner. The concentration of arsenic in the run-off is <0.3 mg/l. The FIG. 2 apparatus first precipitates and separates calcium magnesium arsenates (A1, A2) as well as sulfate and eventually heavy metals, after the preliminary oxidation of As(III) to As(V). This step is followed by another precipitation and separation of sulfate (III, IV) which results in a further reduction of the sulfate content in the remnant waste. After the ion exchanger (B1) there is also a residual concentration of arsenic of <0.3 mg/l.

The apparatus of FIG. 3 provides for the continuous separation of arsenic and processing/treatment of waste water. In steps I and II, sulfate is precipitated as $CaSO_4$. Following that is the precipitation of arsenic and heavy metals in steps A1 and A2, which in turn is followed by a further separation of sulfate in the form of calcium aluminate sulfates in steps III and IV. The final purification process again is carried out with an ion exchanger in step B1. FIG. 4 shows another apparatus for continuous waste treatment, in the process of which the sulfate (step I, II) and subsequently the major part of arsenic is separated through precipitation as calcium magnesium arsenate (step A1, A2). Following that is another precipitation of sulfate in steps III and IV, which in turn is followed by a final purification in an ion exchanger (step B1). An adsorption reactor 7 can be provided as an alternative to the final purification with an ion exchanger.

Oxidation and precipitation reactor 1 is preferably an agitated vessel in the lower part of which a discharge is provided which is connected to a mud collecting line for the precipitation product. The oxidation and precipitation reactor 1 is connected through respective tubes with reservoir 2 for the oxidation agent, reservoir 3 for the calcium compound and reservoir 4 for the magnesium compound (FIG. 4). The reactor also comprises pH control means 5, which makes open- or closed-loop pH control possible through adding a suitable reagent from a corresponding reservoir.

Following the oxidation and precipitation reactor 1 is separation reactor 6 where the separation of the precipitated calcium magnesium arsenate from the remnant water occurs. This separation reactor 6 can also be connected with the mud-collecting line. The separation reactor is preferably a sedimentation reactor. The arsenic containing mud is commonly separately, dehydrated and disposed of.

Adsorption reactor 7 preferably comprises an active carbon fixed bed as well as a regeneration device by means of which the active carbon is regenerated and the desorbed arsenic may preferably be collected. The adsorption reactor can be a substitution for ion exchanger 8, or it can be an additional device, particularly following step II or step A2. It can also be used instead of oxidation and precipitation reactor 1.

Following the adsorption reactor 7 can be provided another precipitation reactor 9, basically of the same kind as oxidation and precipitation reactor 1. This reactor would serve for the precipitation of calcium sulfate and/or calcium aluminate sulfates from waste material with pH control by means of pH control means 12. For this purpose the precipitation reactor 9 is preferably connected through supply tubes with reservoir 10 for lime milk and reservoir 11 for calcium aluminate. Another, unnumbered, separation reactor can follow precipitation reactor 9, in the lower part of which a discharge for the precipitation product is provided which in turn is connected to the mud collecting line. In this additional separation reactor the separation of the precipitation product is completed. Also this separation reactor is then connected to the collecting vessel.

The separation of at least the remnant arsenic takes place in the ion exchanger, preferably in anionic form. Ion exchanger 8 is preferably an anion exchanger which can be a fixed-bed ion exchanger. The regenerate of the ion exchanger can be recycled through a regenerate duct back into the process. The regenerate is the used regenerative agent.

The embodiments depicted in FIGS. 2, 3, and 4 are provided for mud processing with a thickener 13 and a press 14, which may in particular be a chamber filter press. Step B2 is the ion exchanger regeneration step, a conventional regeneration process which is not shown in the drawing.

Advantageously, the apparatus according to the invention is further controlled by means of a central open- or closed-loop control device which can be provided with a micro computer system. In this case sensors and detectors at corresponding processing stations survey the process. The signals are conveyed to a central unit which in turn operates corresponding actuators according to a predetermined program or process model. This makes it possible to carry out the procedure automatically to a large extent. Particularly important is the control of the recirculation of mud.

The following examples for procedures explain the invention in more detail and refer to comparative experiments. The experiments use very different industrial effluents (Wastes I to IX) as well as two synthetic effluents (Synthetic Wastes I and II). The industrial effluents originated from various acidic polishing processes in the glass industry. They all contained the same substances, the concentration of which however, varied, particularly in those substances which can increase due to recirculation. Previous experiments showed that those effluents, containing high amounts of alkali, particularly Na and K, are very hard to treat. Therefore, industrial effluents have been chosen which are of low, medium or high difficulty to be treated.

The composition of the crude waste waters used before each treatment is given in Table 2.

TABLE 2

| Type of Waste | As (mg/l) | Pb (mg/l) | Na (mg/l) | K (mg/l) | F (mg/l) | Add. of Tenside ml/l | Rating |
|---|---|---|---|---|---|---|---|
| Waste I | 12.03 | 8.00 | 63.5 | 139.4 | — | — | Easily treated |
| Waste II | 17.01 | 5.60 | 109.6 | 219 | — | — | Easily treated |

TABLE 2-continued

| Type of Waste | As (mg/l) | Pb (mg/l) | Na (mg/l) | K (mg/l) | F (mg/l) | Add. of Tenside ml/l | Rating |
|---|---|---|---|---|---|---|---|
| Waste III | 24.30 | 5.00 | 1063 | 325 | — | — | Hard to treat |
| Waste IV | 28.5 | — | 318 | 246 | — | — | Medium treatment |
| Waste V | 33.5 | — | 181 | 884 | — | — | Hard to treat |
| Waste VI | 6.9 | 11.5 | 70 | 120 | — | — | Easily treated |
| Waste VII | 14.0 | 6.2 | 93 | 180 | — | — | Medium treatment |
| Waste VIII | 10.6 | — | 397 | 448 | — | — | Hard to treat |
| Waste IX | 22.4 | — | 769 | 589 | — | — | Hard to treat |
| Synthetic Waste I | 163.3 | — | >1000 | >1000 | >1000* | 1 | Easily treated |
| Synthetic Waste II | 15.7 | — | >1000 | >1000 | >1000** | 1 | Easily treated |

*used as $F^\theta$.
**used as $H_2SiF_6$
— means not determined or no additions respectively Within the framework of the experiments it has been attempted to separate As(III) or As(V) respectively from the solutions by means of different precipitation reactions or adsorption, respectively, or by means of ion exchange. The determination of As was generally carried out with atomic adsorption spectrometry (graphite tube technique Ni/As; 1 to 5% analysis error, depending on concentration). By adding $F^\theta$ and $H_2SiF_6$, an eventual disadvantageous effect of complex bound arsenic was examined. However, a disturbation of the precipitation reactions or the As-adsorption, respectively could not be observed. Furthermore it was determined, by adding tensides, whether such agents which lower the interfacial tension disturb the precipitation of calcium magnesium arsenates. Again, no negative effect of such agents could be found.

COMPARATIVE EXAMPLE 1

Arsenic has been precipitated with hydrated calcium oxide {Ca(OH)$_2$} from various effluents, at room temperature and at a pH value of 10.5 to 11. Table 3 is a summary of the results obtained. The residual arsenic content of the wastes is given, in addition to the concentration also as percent ages of the initial arsenic amount (100%) in the used crude waste water. The degree of arsenic separation corresponds to the percentage of separated arsenic with respect to the initial amount of As in the crude waste water.

TABLE 3

| Type of Waste | As (mg/l) | Final As (%) | As separation (%) | Pb (mg/l) | Na (mg/l) | K (mg/l) |
|---|---|---|---|---|---|---|
| Waste I | 2.35 | 19.5 | 80.5 | <0.1 | 10.2 | 115.2 |
| Waste II | 3.5 | 20.6 | 79.4 | <0.1 | 27.6 | 118.3 |
| Waste III | 15.0 | 61.7 | 38.3 | — | 919 | 274 |
| Waste IV | 12.9 | 45.3 | 54.7 | — | 264 | 246 |
| Waste V | 23.9 | 71.3 | 28.7 | — | 159 | 837 |
| Waste VI | 3.0 | 43.5 | 56.5 | — | 70 | 120 |
| Synthetic Waste I | 2.0 | 1.2 | 98.8 | — | >1000 | >1000 |
| Synthetic Waste II | 0.2 | 1.3 | 98.7 | — | >1000 | >1000 |

COMPARATIVE EXAMPLE 2

This experiment has been conducted with waste VI as shown in Table 3 (As content 6.9 mg/l, refer to Table 4), and the arsenic has also been precipitated with Ca(OH)$_2$, wherein the precipitation was carried out without oxidation (Experiments A), or with alkaline oxidation (Experiments B), or with acidic oxidation of As(III) to As(V) (Experiments C). The pH value during the Ca(OH)$_2$ precipitation was 9.0; the precipitation was carried out for 45 min. at 25° C. H$_2$O$_2$ was added as oxidation agent in an alkaline medium during Experiments B, while oxidation was conducted in an acidic medium during Experiments C, and subsequently the pH-value was increased to 9 for the precipitation.

These experiments were conducted with different added amounts of 35% aqueous H$_2$O$_2$ solution per liter of waste. The obtained results are summarized in Table 4. The percentage of residual arsenic is again related to the initial arsenic content (100%). The percentage of As separation is complementary to the percentage of residual arsenic content and corresponds to the percentage of separated As, with respect to the initial As content.

TABLE 4

| Reaction Conditions | As Initial (mg/l) | As Final (mg/l) | As Final % | As Separation % |
|---|---|---|---|---|
| EXPERIMENTS A | | | | |
| (without oxidation) | 6.9 | 2.8 | 40.6 | 59.4 |
| | 6.9 | 3.3 | 47.8 | 52.2 |
| EXPERIMENTS B (alkaline oxidation) | | | | |
| H$_2$O$_2$, 35%: | | | | |
| 1 ml/l | 6.9 | 1.4 | 20.3 | 79.7 |

TABLE 4-continued

| Reaction Conditions | As Initial (mg/l) | As Final (mg/l) | As Final % | As Separation % |
|---|---|---|---|---|
| 3 ml/l | 6.9 | 1.5 | 21.7 | 78.3 |
| 5 ml/l | 6.9 | 1.5 | 21.7 | 78.3 |
| 7 ml/l | 6.9 | 1.7 | 24.6 | 75.4 |
| EXPERIMENTS C (acidic oxidation) $H_2O_2$, 35% | | | | |
| 1 ml/l | 6.9 | 1.7 | 24.6 | 75.4 |
| 3 ml/l | 6.9 | 1.8 | 26.1 | 73.9 |
| 5 ml/l | 6.9 | 1.4 | 20.3 | 79.7 |
| 7 ml/l | 6.9 | 1.7 | 24.6 | 75.4 |

The results show that the oxidation of As(III) to As(V) increases the degree of separation considerably in all cases from 50-60 to about 74-80%), without showing any significant difference between an alkaline and acidic oxidation. It is further apparent that the amounts of added $H_2O_2$ have no relevant effect. Increasing the duration of the reaction to more than 45 min. did not yield better results. The addition of the oxidation agent $H_2O_2$ at a pH-value in the acidic range is preferred, since this secures a long enough reaction time, and the oxidation agent cannot get into the exchanger.

EXAMPLE 1 AND COMPARATIVE EXAMPLE 3

Example 1 refers to the separation of arsenic from waste material or waters through precipitation of calcium magnesium arsenate of low solubility according to the steps A1 and A2 of the procedure according to the invention, while simultaneously using calcium and magnesium compounds as precipitation agents.

Comparative Example 3 refers to the precipitation of arsenic with only the calcium compound. Lime milk {Ca(OH)$_2$} served as calcium compound. Mg(OH)$_2$ was used as magnesium compound. The ratio of the amounts of the precipitation agents was Ca:Mg:AsO$_4$=3:3:1.

The precipitations were carried out for 30 min. at a temperature of 25° C. and a pH value of >10.5 in all cases. Effluents IV and VII used (compare with Table 4) have been considered being of medium difficulty to be treated, and waste VI used as easy to be treated.

After the corresponding compounds have been added to the acidic crude waste water, the pH value was raised to >10.5 and precipitation was carried out. Table 5 is a summary of the results obtained.

TABLE 5

| | WASTE IV | | | WASTE VII | | | WASTE VI | | |
|---|---|---|---|---|---|---|---|---|---|
| | As (mg/l) Initial | As (mg/l) Final | As Separation % | As (mg/l) Initial | As (mg/l) Final | As Separation % | As (mg/l) Initial | As (mg/l) Final | As Separation % |
| Comparative Example 3 | 28.5 | 19.9 | 30.2 | 14.0 | 8.0-9.0 | 35.7-42.9 | 6.9 | 3.0 | 56.5 |
| Example 1 | 28.5 | 16.6 | 41.8 (+11.6) | 14.0 | 5.4-6.0 | 57.1-61.4 (+14.2/25.7) | 6.9 | 2.2 | 68.1 (+11.6) |

The results in Table 5 give evidence that the procedure of the invention according to Example 1, which used a combination of calcium and magnesium compounds, led to significantly better precipitation results compared to Comparative Example 3, which was performed under the same conditions, however using a calcium compound only. Those columns in which the degree of separation of arsenic is reflected also show in parentheses the percentage of the additional separation degree that has been obtained in comparison to Comparative Example 3.

EXAMPLES 2 AND 3 AND COMPARATIVE EXAMPLE 4

These experiments refer to the comparison of pure calcium arsenate precipitation (Comparative Example 4) with the procedure according to the invention. In this case the effluents were subject to precipitation using calcium and magnesium compounds without previous oxidation (Example 2) as well as after oxidation with $H_2O_2$ (Example 3). The oxidation was carried out in the acidic pH ranges. Ca(OH)$_2$ was used as the calcium compound and Mg(OH)$_2$ as the magnesium compound.

Effluents IV and VII were of medium difficulty to be treated; effluents VIII and IX were of high difficulty to be treated. The results obtained are summarized in Table 6.

TABLE 6

| | WASTE VIII | | | WASTE VII | | | WASTE IX | | | WASTE IV | | |
|---|---|---|---|---|---|---|---|---|---|---|---|---|
| | As (mg/l) Initial | As (mg/l) Final | As Separation % | As (mg/l) Initial | As (mg/l) Final | As Separation % | As (mg/l) Initial | As (mg/l) Final | As Separation % | As (mg/l) Initial | As (mg/l) Final | As Separation % |
| Comparative Example 4 | 10.6 | 8.9 | 16.0 | 14.0 | 8.0-9.0 | 35.7-42.9 | 22.4 | 17.6 | 21.4 | 28.5 | 20 | 29.8 |
| Example 2 | 10.6 | 7.7 | 27.4 (+11.4) | 14.0 | 5.4-6.0 | 57.1-61.4 (+14.2/25.7) | 22.4 | 16.8 | 25.0 (+3.6) | 28.5 | 16.6 | 41.8 (+12.0) |
| Example 3 | 10.6 | 5.2 | 50.9 (+34.9) | 14.0 | 1.2-2.2 | 84.3-91.4 (+22.9/34.3) | 22.4 | 13.8 | 38.4 (+17.0) | 28.5 | 6.2 | 78.3 (+48.5) |

The results in Table 6 reflect the significant improvement due to the procedure according to the invention of Examples 2 and 3 compared to the calcium arsenate precipitation (Comparative Example 4). This improvement was reflected for waste of medium treatment difficulty as well as for waste of high treatment difficulty. In the case of oxidation of arsenic in the waste to As(V) (Example 3), the separation result was again significantly better compared to Example 2.

Again the columns referring to the As separation degree for Examples 2 and 3 reflect in parentheses the additional degree of separation compared to Comparative Example 4.

EXAMPLE 4

This example refers to the adsorptive separation of arsenic from waste material by means of setting the arsenic in contact with active carbon, hence the steps C1 and C2 of the procedure according to the invention. In these experiments industrial effluents with a high content of sulfate ions (effluents V) were used. By adding $Ca(OH)_2$ at a pH value of 3.0 the sulfate was precipitated as $CaSO_4$ in 30 min. The precipitated mud was separated.

The prepurified waste obtained, which contained 33.5 mg As/l, was then treated with various amounts of active carbon, after the pH value had been adjusted by adding $Ca(OH)_2$. The As content was measured after every 30 min. The results obtained are reflected in Table 7.

TABLE 7

| Amount Of Active Carbon (g/l) | pH at Adsorption | Initial As (mg/l) | Final As (mg/l) | Degree of As Separation % |
|---|---|---|---|---|
| 0 | 3 | 33.5 | 33.5 | 0 |
| 5 | >10.5 | 33.5 | 21.7 | 35.2 |
| 10 | >10.5 | 33.5 | 13.5 | 59.7 |
| 15 | >10.5 | 33.5 | 0.8 | 97.6 |

These results show that, in contrast to the initially mentioned literature reference, the adsorptive separation of arsenic with active carbon is remarkably efficient because corresponding amounts of active carbon can yield exceptionally high degrees of arsenic separation (for example, 97.6% with 15 g of active carbon per liter).

The adsorption experiments conducted within this framework further showed that the efficiency of As adsorption with active carbon practically does not depend on the pH value of the medium which is brought into contact with the active carbon. Furthermore the separation efficiency does not depend on whether or not the active carbon is separated.

Due to economical considerations the adsorption or separation of the active carbon is favorable at a pH-value of $3\pm1$. Most advantageous is the use of a regenerative active carbon fixed-bed filler which can be regenerated with which the procedural steps C1 and C2 can be carried out simultaneously.

Since 1 kg of active carbon adsorbs 1.2 to 1.6 g of As, the corresponding measuring of the active carbon to be added or dimensioning of a corresponding fixed-bed filter can be done easily.

EXAMPLE 5

This example refers to a preferred embodiment of the process according to the invention wherein the residual arsenic content is removed by means of an ion exchanger, eventually after a previous separation of possible sulfate contents (compare to European patent application 86,108,876), and with or without a previous precipitation of arsenic in form of calcium magnesium arsenates. In this case a mixed-bed ion exchanger was used.

160 g (200 ml) of ion exchanger resin were packed into a glass column (diameter of 2 cm), which was provided with a cock at one end. The height of packing was 80 cm. The sample was taken after a precisely defined throughput at the column outlet. The arsenic content was determined by atomic adsorption spectrometry as mentioned above.

Procedure conditions and analysis results:

| | |
|---|---|
| Rate of flow: | 1.0 l/h |
| Bed exchange: | 6 fold |
| Initial pH: | 11.5 |
| Initial $SO_4$: | 50 mg/l |
| Initial As: | 14 mg/l |
| Conductivity (K)-initial: | 2.3 mS/cm |

After a 2 l throughput (= 8 l/l ion exchange resin):

| | |
|---|---|
| pH final: | 6.5 |
| $SO_4$: | not detectable |
| Conductivity: | 2.1 μS/cm |
| As: | 2.5 μg/l |

The above results show that a complete desalination had taken place. The ion exchanger exchanged not only the arsenic but all other caught ions. The low conductivity indicates a good quality of purified water.

The possibility of recycling the arsenic is very well provided if HCl is used as a regenerative agent for the two ion exchanger resins of the mixed bed. Hereby the anion exchanger is transformed into the Cl form, and the cation exchanger is transformed into the H form.

EXAMPLE 6

This example refers to the separation of residual arsenic from a prepurified waste similar to Example 5 during which, through pre-precipitation with lime milk and subsequent precipitation with calcium aluminate, sulfates are separated to a large degree at a pH value of 11.4 to 11.7. A highly basic, type I, anion exchanger in the Cl form was used in those experiments.

In these experiments various amounts of resin (50, 75 or 200 g) were used, which were packed into a column with a diameter of 2 cm. The rate of flow and the therefore resulting bed exchange were varied. Regeneration was carried out for 40 min. with 200 g HCl 100%/l ion exchanger resin in the form of a 5-8% solution, while the regenerative agent was led through the ion exchanger bed in the flow direction. The results obtained are summed up in Table 8.

TABLE 8

| Resin Mass (g) | 200 | 75 | 50 | 50 |
|---|---|---|---|---|
| Rate of Flow (l/h) | 4.5 | 1 | 1.1 | 0.67 |
| Bed Exchange | 28-fold | 16-fold | 18-fold | 11-fold |
| $SO_4$ Initial (mg/l) | 50 | 50 | 13 | 22 |
| As Initial (mg/l) | 15 | 15 | 14.7 | 15.5 |
| K Initial (mg/l) | — | 4.46 | 3.2 | 2.72 |
| As Content (ppb) after 1 liter throughput | 23.3 | 135 | — | 70.8 |
| 2 liters | — | — | 10.1 | 69.2 |
| 3 liters | 85.4 | 235 | — | 104.9 |
| 4 liters | — | — | 8.7 | 84.4 |
| 5 liters | 154.6 | 250 | — | 85.3 |
| 6 liters | — | — | 10 | 101.0 |
| 7 liters | 193.6 | 262 | 10.1 | — |
| 10 liters | 233.7 | — | — | — |
| K Final (mS/cm) | — | 4.93 | 3.15 | 2.81 |

These results show that no break-through of arsenic occurred, even at a throughput of 7 l, which equals a load of 112 l/l ion exchange resin. This corresponds to a capacity of approximately 2.5 g As/l ion exchange resin. The best purification results were obtained at a low flow rate.

A corresponding decrease in capacity occurs at sulfate concentrations which are too high, since the sulfate ion comes before the arsenic ion in the affinity sequence (compare to above). This requires the elimination of sulfate contents which are too high in a preliminary step, which can easily be done according to the above mentioned procedures.

Further experiments determined the charge capacity of the highly basic anion exchanger used here.

| CONDITIONS | |
|---|---|
| pH: | 11.5 |
| SO$_4$: | 20 mg/l |
| Conductivity: | 2.0 mS/cm |
| As-initially: | 13.4 mg/l |
| Throughput: | 1.2 l/h |
| Bed exchange: | 8.5- fold |
| Interspersed volume: | 35 l |
| As-final: | 10 to 119 ppb |
| Conductivity (K)-final: | 2.30 mS/cm |
| Amount of resin: | 100 g |
| Dimension of column: | Height 760 mm. Diameter 1.8 cm |

The above indicated results suggest a charge capacity (effective volume capacity) of 4.1 to 4.5 g As/l ion exchange resin, which equals approximately 0.25 mval AsO$_4^{3-}$/l ion exchange resin. At least 400 l of waste material can be treated with 1 l of ion exchanger resin with an initial content of 10 mg As/l in the effluents.

As apparent from the above results the content of arsenic in waste can be reduced to the ppb range with the highly basic anion exchanger resin. The purification efficiency is substantially dependent on the degree of oxidation of the arsenic and the throughput as well as the concentration of arsenic. In practice a charge capacity higher than 4.5 g As/l ion exchange resin is quite possible.

The ion exchange resin is preferably used in the chloride form. The chloride set free during the ion exchange can suitably be used as a control parameter for monitoring or controlling the ion exchange process.

In case the regenerate is recycled, a valuable raw material can be regained and led back into the production process. Furthermore, a 100% separation of arsenic through sulfide precipitation can be obtained from the regenerate and the arsenic can be regained. In this fashion recycling as well as other use, for example, depositing, is made possible.

With this invention a new concept of separating arsenic from waste has been provided. This process allows for the first time for a separation of this, to the environment, considerably harmful substance on a technical, industrial scale and under exceptionally economic conditions and in a chemically simple manner. Also important is that the process provides the possibility of recycling the separated arsenic into the production process.

Apart from arsenic other chemically similar anions such as chromate and phosphate are separated from the waste.

The conception of the invention has particularly the following advantages:

The procedure according to the invention can be applied to effluents difficult to be treated and strongly acidic wastes, for example, wastes from acidic polishing processes in the glass industry, which contain more than 10 mg As/l and for which a separation of arsenic through precipitation with Fe, Ca, etc. would not be efficient.

Residual contents of As as low as <1 mg/l are possible by means of precipitation in the form of calcium magnesium arsenates (As<2 mg/l) and subsequent active carbon adsorption. In this case the active carbon may easily be regenerated.

The combination of arsenic precipitation in the form of calcium magnesium arsenate and/or adsorptive separation of arsenic with an ion exchanger yields residual amounts of arsenic of <0.3 mg As/l, which in suitable cases are in the low ppb range.

The arsenic can be precipitated easily and quantitatively in sulfidic form from the regenerate fluids of the ion exchanger regeneration.

The regenerate solutions can be recirculated into a calcium precipitation step or can be "reconcentrated."

The concept of the procedure according to the invention can as well be applied to solutions containing sulfate; the main amount of sulfate can be separated by a preliminary precipitation by means of calcium oxide at approximately pH 3, without coprecipitating arsenic, which eventually, after washing the CaSO$_4$ mud allows for a simple disposing on, for example, rubble disposal sites and household waste disposal sites. By means of a further precipitation in the form of calcium aluminate sulfates, residual SO$_4$ amounts can be efficiently removed. As a preliminary step a considerable amount of the arsenic (roughly about 50 to 80%) can be selectively precipitated in form of calcium magnesium arsenates, which can be disposed of on special disposal sites or may be used in another way.

Tensides, which are present in waste material in significant amounts, do not interfere with either the preliminary sulfate precipitation or the precipitation of the calcium magnesium arsenates.

In view of the above description, it is likely that modifications and improvements to the invention will be possible to those skilled in the art which are within the scope of the appended claims.

What is claimed is:

1. A process for the separation of arsenic from waste material, said process comprising the steps of:
   (A1) precipitating arsenic in the form of low solubility calcium magnesium arsenates by adding at least one calcium compound and at least one magnesium compound to the waste material at a pH value in the range of 2 to 12 during a precipitation span of 10 to 60 minutes;
   (A2) separating the calcium magnesium arsenates;
   (C1) adsorptively separating arsenic by contacting the waste material with active carbon at a pH value in the range of 2 to 11; and
   (C2) separating the charged active carbon by itself or along with precipitation products.

2. The process recited in claim 1, wherein at least one magnesium compound is added in step A1 up to a pH value in the alkaline range, so that magnesium hydroxide is precipitated.

3. The process recited in claim 2, wherein hydrated calcium oxide is used as a calcium compound and/or magnesium hydroxide is used as a magnesium compound in step A1.

4. The process recited in claim 2, wherein mixtures of magnesium and calcium salts are used in step A1, optionally with addition of Ca(OH)$_2$.

5. The process recited in claim 2, wherein magnesium salts, are used as a magnesium compound in step A1.

6. The process recited in claim 5, wherein the magnesium salts used in step A1 comprise magnesium chloride.

7. The process recited in claim 2, wherein steps C1 and C2 are performed simultaneously by contacting the waste material with an active-carbon fixed bed.

8. The process recited in claim 2, wherein powdered active carbon is introduced into the waste material in step C1.

9. The process recited in claim 2, and comprising the further step of thermally regenerating the charged active carbon from step C2, thereby yielding the arsenic from the active carbon.

10. The process recited in claim 1, wherein hydrated calcium oxide is used as a calcium compound and/or magnesium hydroxide is used as a magnesium compound in step A1.

11. The process recited in claim 10, wherein steps C1 and C2 are performed simultaneously by contacting the waste material with an active-carbon fixed bed.

12. The process recited in claim 10, wherein powdered active carbon is introduced into the waste material in step C1.

13. The process recited in claim 10, and comprising the further step of thermally regenerating the charged active carbon from the step C2, thereby yielding the arsenic from the active carbon.

14. The process recited in claim 1, wherein mixtures of magnesium and calcium salts are used in step A1, optionally with addition of $Ca(OH)_2$.

15. The process recited in claim 14, wherein steps C1 and C2 are performed simultaneously by contacting the waste material with an active-carbon fixed bed.

16. The process recited in claim 14, wherein powdered active carbon is introduced into the waste material in step C1.

17. The process recited in claim 14, and comprising the further step of thermally regenerating the charged active carbon from step C2, thereby yielding the arsenic from the active carbon.

18. The process recited in claim 1, wherein magnesium salts, are used as a magnesium compound in step A1.

19. The process recited in claim 18, wherein steps C1 and C2 are performed simultaneously by contacting the waste material with an active-carbon fixed bed.

20. The process recited in claim 18, wherein powdered active carbon is introduced into the waste material in step C1.

21. The process recited in claim 18, and comprising the further step of thermally regenerating the charged active carbon from step C2, thereby yielding the arsenic from the active carbon.

22. The process recited in claim 18, wherein the magnesium salts used in step A1 comprise magnesium chloride.

23. The process recited in claim 1, wherein steps C1 and C2 are performed simultaneously by contacting the waste material with an active-carbon fixed bed.

24. The process recited in claim 23, and comprising the further step of thermally regenerating the charged active carbon from step C2, thereby yielding the arsenic from the active carbon.

25. The process recited in claim 1, wherein powdered active carbon is introduced into the waste material in step C1.

26. The process recited in claim 25, and comprising the further step of thermally regenerating the charged active carbon from step C2, thereby yielding the arsenic from the active carbon.

27. The process recited in claim 1, and comprising the further step of thermally regenerating the charged active carbon from step C2, thereby yielding the arsenic from the active carbon.

28. The process recited in claim 1, and comprising the further step of washing the precipitation products or solid materials from steps A2 or C2 respectively with water, after setting the pH value, and recycling the water to the waste material.

29. The process recited in claim 1, wherein in step A1, the precipitation of arsenic is carried out at a pH value range of 9 to 11 during a precipitation span of about 30 minutes, and in step C1, the adsorptive separation of arsenic is carried out at a pH value in the range of 2 to 4.

30. A process for the separation of arsenic from waste material, comprising the steps of:
(A1) precipitating arsenic in the form of low solubility calcium magnesium arsenates by adding at least one calcium compound and at least one magnesium compound to the waste material at a pH value in the range of 2 to 12 during a precipitation span of 10 to 60 minutes;
(A2) separating the calcium magnesium arsenates;
(B1) contacting the waste material with an ion exchanger at a pH value in the range of 2 to 12;
(C1) adsorptively separating arsenic by contacting the waste with active carbon at a pH value in the range of 2 to 11; and
(C2) separating the charged active carbon by itself or along with precipitation products.

31. The process recited in claim 30, and comprising the further step of oxidizing arsenic(III) in the waste material to $AsO_4^{3-}$ by adding an oxidation agent selected from the group consisting of $CaO_2$, $MgO_2$ and $H_2O_2$ and at a pH value in the acidic range, to the waste material to be treated before step A1 or C1 respectively.

32. The process recited in claim 31, wherein at least one magnesium compound is added in step A1 up to a pH value in the alkaline range, so that magnesium hydroxide is precipitated.

33. The process recited in claim 32, wherein the step of oxidizing the arsenic (III) contained in the waste material is carried out before or in a precipitation reactor provided for the precipitation step to follow.

34. The process recited in claim 31, wherein hydrated calcium oxide is used as a calcium compound and/or magnesium hydroxide is used as a magnesium compound in step A1.

35. The process recited in claim 34, wherein the step of oxidizing the arsenic (III) contained in the waste material is carried out before or in a precipitation reactor provided for the precipitation step to follow.

36. The process recited in claim 31, wherein mixtures of magnesium and calcium salts are used in step A1, optionally with addition of $Ca(OH)_2$.

37. The process recited in claim 36, wherein the step of oxidizing the arsenic (III) contained in the waste material is carried out before or in a precipitation reactor provided for the precipitation step to follow.

38. The process recited in claim 31, wherein magnesium salts, are used as a magnesium compound in step A1.

39. The process recited in claim 38, wherein the step of oxidizing the arsenic (III) contained in the waste material is carried out before or in a precipitation reactor provided for the precipitation step to follow.

40. The process recited in claim 38, wherein the magnesium salts used in step A1 comprise magnesium chloride.

41. The process recited in claim 31, wherein steps C1 and C2 are performed simultaneously by contacting the waste material with an active-carbon fixed bed.

42. The process recited in claim 41, wherein the step of oxidizing the arsenic (III) contained in the waste material is carried out before or in a precipitation reactor provided for the precipitation step to follow.

43. The process recited in claim 31, wherein powdered active carbon is introduced into the waste material in step C1.

44. The process recited in claim 43, wherein the step of oxidizing the arsenic (III) contained in the waste material is carried out before or in a precipitation reactor provided for the precipitation step to follow.

45. The process recited in claim 31, and comprising the further step of thermally regenerating the charged active carbon from step C2, thereby yielding the arsenic from the active carbon.

46. The process recited in claim 45, wherein the step of oxidizing the arsenic (III) contained in the waste material is carried out before or in a precipitation reactor provided for the precipitation step to follow.

47. The process recited in claim 31, wherein an anion exchanger in the form of chloride is used in step B1.

48. The process recited in claim 47, wherein the step of oxidizing the arsenic (III) contained in the waste material is carried out before or in a precipitation reactor provided for the precipitation step to follow.

49. The process recited in claim 31, wherein the step of oxidizing the arsenic (III) contained in the waste material is carried out before or in a precipitation reactor provided for the precipitation step to follow.

50. The process recited in claim 30, wherein at least one magnesium compound is added in step A1 up to a pH value in the alkaline range, so that magnesium hydroxide is precipitated.

51. The process recited in claim 30, wherein hydrated calcium oxide is used as a calcium compound and/or magnesium hydroxide is used as a magnesium compound in step A1.

52. The process recited in claim 30, wherein mixtures of magnesium and calcium salts are used in step A1, optionally with addition of $Ca(OH)_2$.

53. The process recited in claim 30, wherein magnesium salts, are used as a magnesium compound in step A1.

54. The process recited in claim 53, wherein the magnesium salts used in step A1 comprise magnesium chloride.

55. The process recited in claim 30, wherein steps C1 and C2 are performed simultaneously by contacting the waste material with an active-carbon fixed bed.

56. The process recited in claim 30, wherein powdered active carbon is introduced into the waste material in step C1.

57. The process recited in claim 30, and comprising the further step of thermally regenerating the charged active carbon from step C2, thereby yielding the arsenic from the active carbon.

58. The process recited in claim 30, and comprising the further step of washing the precipitation products or solid materials from steps A2 or C2 respectively with water, after setting the pH value, and recycling the water to the waste material.

59. The process recited in claim 30, wherein an anion exchanger in the form of chloride is used in step B1.

60. The process recited in claim 30, wherein in step A1, the precipitation of arsenic is carried out at a pH value range of 9 to 11 during a precipitation span of about 30 minutes, in step B1, the waste material is contacted with a strongly basic anion exchanger at a pH value in the range of 7 to 11.5, and in step C1, the adsorptive separation of arsenic is carried out at a pH value in the range of 2 to 4.

61. A process for the separation of arsenic from waste material, comprising the steps of:
   (A1) precipitating arsenic in the form of low solubility calcium magnesium arsenates by adding at least one calcium compound and at least one magnesium compound to the waste material at a pH value in the range of 2 to 12 during a precipitation span of 10 to 60 minutes;
   (A2) separating the calcium magnesium arsenates;
   (B1) contacting the waste material with an ion exchanger at a pH value in the range of 2 to 12;
   (B2) regenerating the ion exchanger after reaching the charge limit;
   (C1) adsorptively separating arsenic by contacting the waste with active carbon at a pH value in the range of 2 to 11; and
   (C2) separating the charged active carbon by itself or along with precipitation products.

62. The process recited in claim 61, and comprising the further step of oxidizing arsenic(III) in the waste material to $AsO_4^{3-}$ by adding an oxidation agent selected from the group consisting of $CaO_2$, $MgO_2$ and $H_2O_2$ and at a pH value in the acidic range, to the waste material to be treated before step A1, B1 or C1 respectively.

63. The process recited in claim 62, wherein magnesium salts, are used as a magnesium compound in step A1.

64. The process recited in claim 63, wherein the magnesium salts used in step A1 comprise magnesium chloride.

65. The process recited in claim 62, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

66. The process recited in claim 61, and comprising the further steps of separating sulfate ions from the waste material before step A1, B1 or C1 or after step A2, B2 or C2 respectively, by:
   (I) precipitating $CaSO_4$ by adding $Ca(OH)_2$ to the waste, while the precipitation, if it is effected before step A1, being carried out at a pH value of $3\pm 1$, and, if it is effected before step B1 or before step C1, being carried out at a pH value in the range of $3\pm 1$ or 8.0 to 11.0;
   (II) separating the precipitated $CaSO_4$ and possibly precipitated heavy metal hydroxides; and/or
   (III) precipitating low solubility calcium aluminate sulfates by adding reactive aluminum oxide and/or calcium aluminates to the waste material while regulating and maintaining the pH-value with $Ca(OH)_2$ in the range of 11.2 to 11.8; and
   (IV) separating the precipitated calcium aluminate sulfates.

67. The process recited in claim 66, wherein at least one magnesium compound is added in step A1 up to a pH value in the alkaline range, so that magnesium hydroxide is precipitated.

68. The process recited in claim 67, and comprising the further step of washing the precipitation products or solid materials from steps A2, C2 or IV respectively with water, after setting the pH value, and recycling the water to the waste material.

69. The process recited in claim 68, wherein the pH-value of $3\pm1$ in step I is maintained.

70. The process recited in claim 66, wherein hydrated calcium oxide is used as a calcium compound and/or magnesium hydroxide is used as a magnesium compound in step A1.

71. The process recited in claim 70, and comprising the further step of washing the precipitation products or solid materials from steps A2, C2 or IV respectively with water, after setting the pH value, and recycling the water to the waste material.

72. The process recited in claim 70, wherein the pH-value of $3\pm1$ in step I is maintained.

73. The process recited in claim 66, wherein mixtures of magnesium and calcium salts are used in step A1, optionally with addition of $Ca(OH)_2$.

74. The process recited in claim 73, and comprising the further step of washing the precipitation products or solid materials from steps A2, C2 or IV respectively with water, after setting the pH value and recycling the water to the waste material.

75. The process recited in claim 73, wherein the pH-value of $3\pm1$ in step I is maintained.

76. The process recited in claim 66, wherein magnesium salts, are used as a magnesium compound in step A1.

77. The process recited in claim 76, and comprising the further step of washing the precipitation products or solid materials from steps A2, C2 or IV respectively with water, after setting the pH value, and recycling the water to the waste material.

78. The process recited in claim 76, wherein the pH-value of $3\pm1$ in step I is maintained.

79. The process recited in claim 76, wherein the magnesium salts used in step A1 comprise magnesium chloride.

80. The process recited in claim 66, wherein steps C1 and C2 are performed simultaneously by contacting the waste material with an active-carbon fixed bed.

81. The process recited in claim 80, and comprising the further step of washing the precipitation products or solid materials from steps A2, C2 or IV respectively with water, after setting the pH value, and recycling the water to the waste material.

82. The process recited in claim 80, wherein the pH-value of $3\pm1$ in step I is maintained.

83. The process recited in claim 66, wherein powdered active carbon is introduced into the waste material in step C1.

84. The process recited in claim 83, and comprising the further step of washing the precipitation products or solid materials from steps A2, C2 or IV respectively with water, after setting the pH value, and recycling the water to the waste material.

85. The process recited in claim 83, wherein the pH-value of $3\pm1$ in step I is maintained.

86. The process recited in claim 66, and comprising the further step of thermally regenerating the charged active carbon from step C2, thereby yielding the arsenic from the active carbon.

87. The process recited in claim 86, and comprising the further step of washing the precipitation products or solid materials from steps A2, C2 or IV respectively with water, after setting the pH value, and recycling the water to the waste material.

88. The process recited in claim 86, wherein the pH-value of $3\pm1$ in step I is maintained.

89. The process recited in claim 66, and comprising the further step of washing the precipitation products or solid materials from steps A2, C2 or IV respectively with water, after setting the pH value, and recycling the water to the waste material.

90. The process recited in claim 89, wherein the pH-value of $3\pm1$ in step I is maintained.

91. The process recited in claim 66, wherein an anion exchanger in the form of chloride is used in step B1.

92. The process recited in claim 91, wherein the pH-value of $3\pm1$ in step I is maintained.

93. The process recited in claim 66, wherein the pH-value of $3\pm1$ in step I is maintained.

94. The process recited in claim 61, wherein at least one magnesium compound is added in step A1 up to a pH value in the alkaline range, so that magnesium hydroxide is precipitated.

95. The process recited in claim 94, and comprising the further step of recycling the regenerative solutions from step B2 to the step of precipitation of arsenic in step A1 or the step of adsorptive separation of arsenic in step C1.

96. The process recited in claim 94, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

97. The process recited in claim 94, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

98. The process recited in claim 61, wherein hydrated calcium oxide is used as a calcium compound and/or magnesium hydroxide is used as a magnesium compound in step A1.

99. The process recited in claim 98, and comprising the further step of recycling the regenerative solutions from step B2 to the step of precipitation of arsenic in step A1 or the step of adsorptive separation of arsenic in step C1.

100. The process recited in claim 98, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

101. The process recited in claim 98, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

102. The process recited in claim 61, wherein mixtures of magnesium and calcium salts are used in step A1, optionally with addition of Ca(OH)$_2$.

103. The process recited in claim 102, and comprising the further step of recycling the regenerative solutions from step B2 to the step of precipitation of arsenic in step A1 or the step of adsorptive separation of arsenic in step C1.

104. The process recited in claim 102, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

105. The process recited in claim 102, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

106. The process recited in claim 61, wherein magnesium salts, are used as a magnesium compound in step A1.

107. The process recited in claim 106, and comprising the further step of recycling the regenerative solutions from step B2 to the step of precipitation of arsenic in step A1 or the step of adsorptive separation of arsenic in step C1.

108. The process recited in claim 106, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

109. The process recited in claim 106, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

110. The process recited in claim 106, wherein the magnesium salts used in step A1 comprise magnesium chloride.

111. The process recited in claim 61, wherein steps C1 and C2 are performed simultaneously by contacting the waste material with an active-carbon fixed bed.

112. The process recited in claim 111, and comprising the further step of recycling the regenerative solutions from step B2 to the step of precipitation of arsenic in step A1 or the step of adsorptive separation of arsenic in step C1.

113. The process recited in claim 111, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

114. The process recited in claim 111, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

115. The process recited in claim 61, wherein powdered active carbon is introduced into the waste material in step C1.

116. The process recited in claim 115, and comprising the further step of recycling the regenerative solutions from step B2 to the step of precipitation of arsenic in step A1 or the step of adsorptive separation of arsenic in step C1.

117. The process recited in claim 115, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

118. The process recited in claim 115, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

119. The process recited in claim 61, and comprising the further step of thermally regenerating the charged active carbon from step C2, thereby yielding the arsenic from the active carbon.

120. The process recited in claim 119, and comprising the further step of recycling the regenerative solutions from step B2 to the step of precipitation of arsenic in step A1 or the step of adsorptive separation of arsenic in step C1.

121. The process recited in claim 119, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

122. The process recited in claim 119, and comprising the further steps of precipitating the arsenic in the form of arsenic sulfide from the solutions of regenerated material resulting from step B2, separating the arsenic sulfides, and recycling the obtained solutions to step A1 or to step C1, or using them again as regeneration solutions.

123. The process recited in claim 61, and comprising the further step of washing the precipitation products or solid materials from steps A2 or C2 respectively with water, after setting the pH value, and recycling the water to the waste material.

124. The process recited in claim 123, and comprising the further step of recycling the regenerative solutions from step B2 to the step of precipitation of arsenic in step A1 or the step of adsorptive separation of arsenic in step C1.

125. The process recited in claim 123, wherein an anion exchanger in the form of chloride is used in step B1.

126. The process recited in claim 123, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

127. The process recited in claim 123, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

128. The process recited in claim 61, and comprising the further step of recycling the regenerative solutions from step B2 to the step of precipitation of arsenic in step A1 or the step of adsorptive separation of arsenic in step C1.

129. The process recited in claim 128, wherein an anion exchanger in the form of chloride is used in step B1.

130. The process recited in claim 128, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

131. The process recited in claim 128, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

132. The process recited in claim 61, wherein an anion exchanger in the form of chloride is used in step B1.

133. The process recited in claim 132, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

134. The process recited in claim 132, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

135. The process recited in claim 61, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

136. The process recited in claim 135, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

137. The process recited in claim 61, and comprising the further steps of precipitating the arsenic in the form of arsenic sulfides from the solutions of regenerated material resulting from step B2, separating the arsenic sulfides, and recycling the obtained solutions to step A1, or to step C1, or using them again as regeneration solutions.

138. A process for the separation of arsenic from waste material comprising the steps of:
(A1) precipitating arsenic in the form of low solubility calcium magnesium arsenates by adding at least one calcium compound and at least one magnesium compound to the waste material at a pH value in the range of 2 to 12 during a precipitation span of 10 to 60 minutes;
(B1) contacting the waste material with an ion exchanger at a pH value in the range of 2 to 12;
(C1) adsorptively separating arsenic by contacting the waste with active carbon at a pH value in the range of 2 to 11; and
(C2) separating the charged active carbon by itself or along with precipitation products.

139. The process recited in claim 138, and comprising the further step of oxidizing arsenic(III) in the waste material to $AsO_4^{3-}$ by adding an oxidation agent selected from the group consisting of $CaO_2$, $MgO_2$ and $H_2O_2$ and at a pH value in the acidic range, to the waste material to be treated before step A1, B1 or C1 respectively.

140. The process recited in claim 138, wherein at least one magnesium compound is added in step A1 up to a pH value in the alkaline range, so that magnesium hydroxide is precipitated.

141. The process recited in claim 140, wherein an anion exchanger in the form of chloride is used in step B1.

142. The process recited in claim 138, wherein hydrated calcium oxide is used as a calcium compound and/or magnesium hydroxide is used as a magnesium compound in step A1.

143. The process recited in claim 142, wherein an anion exchanger in the form of chloride is used in step B1.

144. The process recited in claim 138, wherein mixtures of magnesium and calcium salts are used in step A1, optionally with addition of $Ca(OH)_2$.

145. The process recited in claim 144, wherein an anion exchanger in the form of chloride is used in step B1.

146. The process recited in claim 138, wherein magnesium salts, are used as a magnesium compound in step A1.

147. The process recited in claim 146, wherein an anion exchanger in the form of chloride is used in step B1.

148. The process recited in claim 146, wherein the magnesium salts used in step A1 comprise magnesium chloride.

149. The process recited in claim 138, wherein steps C1 and C2 are performed simultaneously by contacting the waste material with an active-carbon fixed bed.

150. The process recited in claim 149, wherein an anion exchanger in the form of chloride is used in step B1.

151. The process recited in claim 138, wherein powdered active carbon is introduced into the waste material in step C1.

152. The process recited in claim 151, wherein an anion exchanger in the form of chloride is used in step B1.

153. The process recited in claim 138, and comprising the further step of thermally regenerating the charged active carbon from step C2, thereby yielding the arsenic from the active carbon.

154. The process recited in claim 153, wherein an anion exchanger in the form of chloride is used in step B1.

155. The process recited in claim 138, wherein an anion exchanger in the form of chloride is used in step B1.

156. The process recited in claim 138, wherein in step A1, the precipitation of arsenic is carried out at a pH value range of 9 to 11 during a precipitation span of about 30 minutes, in step B1, the waste material is contacted with a strongly basic anion exchanger at a pH value in the range of 7 to 11.5, and in step C1, the adsorptive separation of arsenic is carried out at a pH value in the range of 2 to 4.

157. A process for the separation of arsenic from waste material comprising the steps of:
(A1) precipitating arsenic in the form of low solubility calcium magnesium arsenates by adding at least one calcium compound and at least one magnesium compound to the waste material at a pH value in the range of 2 to 12 during a precipitation span of 10 to 60 minutes;
(B1) contacting the waste material with an ion exchanger at a pH value in the range of 2 to 12;
(B2) regenerating the ion exchanger after reaching the charge limit;
(C1) adsorptively separating arsenic by contacting the waste with active carbon at a pH value in the range of 2 to 11; and
(C2) separating the charged active carbon by itself or along with precipitation products.

158. The process recited in claim 157, and comprising the further step of oxidizing arsenic(III) in the waste material to $AsO_4^{3-}$ by adding an oxidation agent selected from the group consisting of $CaO_2$, $MgO_2$ and $H_2O_2$ and at a pH value in the acidic range, to the waste material to be treated before step A1, B1 or C1 respectively.

159. The process recited in claim 158, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

160. The process recited in claim 157, wherein at least one magnesium compound is added in step A1 up to a pH value in the alkaline range, so that magnesium hydroxide is precipitated.

161. The process recited in claim 160, and comprising the further step of recycling the regenerative solutions from step B2 to the step of precipitation of arsenic in step A1 or the step of adsorptive separation of arsenic in step C1.

162. The process recited in claim 160, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

163. The process recited in claim 160, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

164. The process recited in claim 157, wherein hydrated calcium oxide is used as a calcium compound and/or magnesium hydroxide is used as a magnesium compound in step A1.

165. The process recited in claim 164, and comprising the further step of recycling the regenerative solutions from step B2 to the step of precipitation of arsenic in step A1 or the step of adsorptive separation of arsenic in step C1.

166. The process recited in claim 164, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

167. The process recited in claim 164, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

168. The process recited in claim 157, wherein mixtures of magnesium and calcium salts are used in step A1, optionally with addition of $Ca(OH)_2$.

169. The process recited in claim 168, and comprising the further step of recycling the regenerative solutions from step B2 to the step of precipitation of arsenic in step A1 or the step of adsorptive separation of arsenic in step C1.

170. The process recited in claim 168, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

171. The process recited in claim 168, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

172. The process recited in claim 157, wherein magnesium salts, are used as a magnesium compound in step A1.

173. The process recited in claim 172, and comprising the further step of recycling the regenerative solutions from step B2 to the step or precipitation of arsenic in step A1 or the step of adsorptive separation of arsenic in step C1.

174. The process recited in claim 172, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

175. The process recited in claim 172, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

176. The process recited in claim 172, wherein the magnesium salts used in step A1 comprise magnesium chloride.

177. The process recited in claim 157, wherein steps C1 and C2 are performed simultaneously by contacting the waste material with an active-carbon fixed bed.

178. The process recited in claim 177, and comprising the further step of recycling the regenerative solutions from step B2 to the step of precipitation of arsenic in step A1 or the step of adsorptive separation of arsenic in step C1.

179. The process recited in claim 177, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

180. The process recited in claim 177, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

181. The process recited in claim 157, wherein powdered active carbon is introduced into the waste material in step C1.

182. The process recited in claim 181, and comprising the further step of recycling the regenerative solutions from step B2 to the step of precipitation of arsenic in step A1 or the step of adsorptive separation of arsenic in step C1.

183. The process recited in claim 181, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

184. The process recited in claim 181, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

185. The process recited in claim 157, and comprising the further step of thermally regenerating the charged active carbon from step C2, thereby yielding the arsenic from the active carbon.

186. The process recited in claim 185, and comprising the further step of recycling the regenerative solutions from step B2 to the step of precipitation of arsenic in step A1 or the step of adsorptive separation of arsenic in step C1.

187. The process recited in claim 185, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

188. The process recited in claim 185, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

189. The process recited in claim 157, and comprising the further step of recycling the regenerative solutions from step B2 to the step of precipitation of arsenic in step A1 or the step of adsorptive separation of arsenic in step C1.

190. The process recited in claim 189, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

191. The process recited in claim 189, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

192. The process recited in claim 157, wherein an anion exchanger in the form of chloride is used in step B1.

193. The process recited in claim 192, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

194. The process recited in claim 192, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

195. The process recited in claim 157, wherein a mixed bed ion exchanger is used with an anion exchanger in the form of chloride and a cation exchanger in H-form in step B1 and the regeneration of the ion exchanger in step B2 is accomplished with hydrochloric acid as the regenerative agent.

196. The process recited in claim 195, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

197. The process recited in claim 157, and comprising the further steps of precipitating the arsenic in the form of arsenic sulfides from the solutions of regenerated material resulting from step B2, separating the arsenic sulfides, and recycling the obtained solutions to step A1 or to step C1, or using them again as regeneration solutions.

198. The process recited in claim 157, wherein in step A1, the precipitation of arsenic is carried out at a pH value range of 9 to 11 during a precipitation span of about 30 minutes, in step B1, the waste material is contacted with a strongly basic anion exchanger at a pH value in the range of 7 to 11.5, and in step C1, the adsorptive separation of arsenic is carried out at a pH value in the range of 2 to 4.

199. The process recited in claim 61, wherein in step A1, the precipitation of arsenic is carried out at a pH value range of 9 to 11 during a precipitation span of about 30 minutes, in step B1, the waste material is contacted with a strongly basic anion exchanger at a pH value in the range of 7 to 11.5, and in step C1, the adsorptive separation of arsenic is carried out at a pH value in the range of 2 to 4.

* * * * *